(12) United States Patent
Meinke et al.

(10) Patent No.: US 8,113,695 B2
(45) Date of Patent: Feb. 14, 2012

(54) TRIM COMPONENT WITH CONCEALED INDICIUM

(75) Inventors: Joseph S. Meinke, Gowen, MI (US);
Robert L. Bingle, Zeeland, MI (US);
Todd Pastrick, Spring Lake, MI (US);
Ian R. Pettigrew, Sparta, MI (US);
Thomas R. Futryk, Grand Haven, MI (US); Todd W. Trap, Kentwood, MI (US)

(73) Assignee: ADAC Plastics, Inc., Grand Rapids, MI (US)

( * ) Notice: Subject to any disclaimer, the term of this patent is extended or adjusted under 35 U.S.C. 154(b) by 65 days.

(21) Appl. No.: 12/486,986

(22) Filed: Jun. 18, 2009

(65) Prior Publication Data

US 2009/0257241 A1    Oct. 15, 2009

Related U.S. Application Data

(63) Continuation-in-part of application No. 11/926,731, filed on Oct. 29, 2007, now abandoned, which is a continuation of application No. 11/161,501, filed on Aug. 5, 2005, now Pat. No. 7,350,949.

(60) Provisional application No. 60/593,677, filed on Feb. 4, 2005.

(51) Int. Cl.
*F21V 11/00* (2006.01)
(52) U.S. Cl. ........................... 362/351; 362/214
(58) Field of Classification Search .................. 362/471, 362/351, 214, 501, 482, 489, 540, 542
See application file for complete search history.

(56) References Cited

U.S. PATENT DOCUMENTS

| | | | |
|---|---|---|---|
| 2,456,376 A | | 12/1948 | Chirelstein |
| 3,514,589 A | | 5/1970 | Huber |
| 3,584,401 A | | 6/1971 | Cryer et al. |
| 4,020,338 A | | 4/1977 | Kirsch |
| 4,041,302 A | | 8/1977 | Koljonen |
| 4,704,667 A | | 11/1987 | Ploeger |
| 4,812,831 A | * | 3/1989 | Laier ............................ 345/175 |
| 4,835,666 A | | 5/1989 | Feger et al. |
| 4,855,877 A | | 8/1989 | Otaka |
| 5,005,983 A | | 4/1991 | Draffen et al. |
| 5,353,154 A | | 10/1994 | Lutz et al. |
| 5,456,955 A | | 10/1995 | Muggli |
| 5,698,826 A | * | 12/1997 | Cracraft et al. ............... 200/5 A |

(Continued)

FOREIGN PATENT DOCUMENTS

DE      3836572 A1    5/1990

(Continued)

*Primary Examiner* — Julie Shallenberger
(74) *Attorney, Agent, or Firm* — McGarry Bair PC

(57) ABSTRACT

A component of an actuatable apparatus has a substrate, a selectively light- transmissive opaque covering, and an illumination source. The opaque covering is applied to an obverse surface or a reverse surface of the substrate to selectively enable and prevent transmission of light therethrough. The illumination source is adjacent the reverse surface for illuminating a selected area of the substrate. The opaque covering is characterized by first and second portions collectively defining a pattern associated with the selected area. The first portion enables transmission of light therethrough, and the second portion prevents or impedes transmission of light therethrough. Actuation of the illumination source directs light through the first portion but not through the second portion to reveal the pattern. The opaque covering renders the pattern invisible when the illumination source is in the non-illuminated state, and visible when the illumination source is in the illuminated state.

9 Claims, 18 Drawing Sheets

U.S. PATENT DOCUMENTS

| | | | |
|---|---|---|---|
| 5,826,967 A | 10/1998 | Mathieu | |
| 6,326,569 B1 * | 12/2001 | Ardrey et al. | 200/314 |
| 6,356,376 B1 | 3/2002 | Tonar et al. | |
| 6,409,371 B2 | 6/2002 | Aikawa | |
| 6,464,381 B2 | 10/2002 | Anderson, Jr. et al. | |
| 6,561,679 B1 | 5/2003 | Erion et al. | |
| 6,773,129 B2 | 8/2004 | Anderson, Jr. et al. | |
| 6,899,374 B1 * | 5/2005 | Heard | 296/155 |
| 6,971,758 B2 | 12/2005 | Inui et al. | |
| 7,077,550 B2 | 7/2006 | Egashira | |
| 7,135,085 B2 | 11/2006 | Aso et al. | |
| 2003/0031025 A1 | 2/2003 | Huizenga | |
| 2005/0047162 A1 | 3/2005 | Baek | |
| 2005/0116818 A1 | 6/2005 | Kennedy et al. | |

FOREIGN PATENT DOCUMENTS

| | | |
|---|---|---|
| DE | 4109532 A1 | 10/1991 |
| DE | 10307473 A1 | 9/2004 |
| EP | 1344688 A2 | 9/2003 |
| FR | 2806681 A1 | 9/2001 |
| GB | 2205190 A | 11/1988 |
| GB | 2412806 A | 10/2005 |
| JP | 2002-133920 A | 5/2002 |
| WO | 00/17900 A1 | 3/2000 |
| WO | 2006/048627 A1 | 5/2006 |

* cited by examiner

TRIM COMPONENT WITH CONCEALED INDICIUM

CROSS-REFERENCE TO RELATED APPLICATIONS

This application is a continuation-in-part of U.S. application Ser. No. 11/926,731, filed Oct. 29, 2007, which is a continuation of U.S. application Ser. No. 11/161,501, filed Aug. 5, 2005, now U.S. Pat. No. 7,350,949, issued Apr. 1, 2008, which claims the benefit of U.S. provisional application Ser. No. 60/593,677, filed Feb. 4, 2005, and which are incorporated herein in their entirety.

BACKGROUND OF THE INVENTION

1. Field of the Invention

The invention relates generally to a visual display. In one aspect, the invention relates to a display having indicia or other markings that are visually discernable only when an illumination source of the display is in an illuminated state. The display can be integrated into a variety of objects, including vehicular trim components.

2. Description of the Related Art

Automobiles comprise several types of decorative and functional vehicular trim components that are mounted to an exterior or interior surface of the automobile. Examples of external trim components include, but are not limited to, spoilers, door handles, license plate frames, and various bars, such as a lighting bar above the license plate and a bar for mounting a center high mount stop light (CHMSL). Some of these components include indicia or other visual markings. The visual markings can be static, such as decorative markings that customize the appearance of the vehicle or indicia to communicate information, such as the make or model of the vehicle (known as vehicle badging), to an observer. Other visual markings are dynamic or interactive, such as turn signal indicators and brake lights that illuminate to communicate an intended action of the driver. Another example of a dynamic visual marking is a keypad of a keyless entry system. Typically, the keypad is mounted on a door panel or a door handle and has a plurality of individual keys with numbers or letters thereon so that a user can depress the keys in a predetermined sequence to unlock the door of the vehicle.

Unfortunately, some of the visual markings, such as turn signal indicators, keypads, and controls on the interior of the vehicle (e.g., cruise control, radio, and climate controls) do not contribute positively to the aesthetic appearance of the vehicle. Even when these visual markings are not illuminated while not in use, the non-illuminated marking is viewable by an observer. Furthermore, some visual markings that are not used at all times but are always visually discernable can actually distract a driver. It is therefore desirable for these visual markings to be viewable only when they are employed. Additionally, the appearance of static visual markings, such as decorative markings, vehicle make/model indicia, and displays on the interior of the vehicle (e.g., instrument panel displays), can be drab and lackluster and, therefore, fail to create a selected appearance or fail to attract sufficient attention to the visual markings. In the latter case, the vehicle manufacturer advantageously utilizes vehicle badging to not only identify the make and model of the vehicle but also as an advertising medium. A more visually captivating vehicle badging would be a more effective promotional tool. It is therefore desirable for a vehicular component to have visually alluring indicia or other markings.

Additionally, numerous items other than vehicular trim components have unexciting displays and controls and, therefore, suffer from similar deficiencies. Examples of such objects include household appliances, audio and video equipment, and signs. In today's competitive markets, the visual appearance of a product or a display associated with a product or a business can be a significant factor in a customer's purchase decision, and a stimulating visual appearance that sets one product or display apart from others can positively influence the customer in his or her purchase decision.

SUMMARY OF THE INVENTION

In one embodiment, a component of an actuatable apparatus has a substrate, a selectively light-transmissive opaque covering, and an illumination source. The substrate includes an obverse surface and an opposed reverse surface, one of the obverse surface and the reverse surface defining a transparent selected area. The opaque covering is applied to one of the obverse surface and the reverse surface to selectively enable and prevent transmission of light therethrough. The illumination source is actuatable between an illuminated state and a non-illuminated state, and adjacent the reverse surface for illuminating the selected area. The opaque covering is disposed to intercept light directed through the selected area, and is characterized by first and second portions collectively defining a pattern associated with the selected area. The first portion has a first transmissivity to light to enable transmission of light therethrough, and the second portion has a second transmissivity to light to prevent or impede transmission of light therethrough. Actuation of the illumination source directs light through the first portion but not through the second portion to thereby reveal the pattern. The opaque covering renders the pattern invisible when the illumination source is in the non-illuminated state, and visible when the illumination source is in the illuminated state.

In another embodiment, a method of fabricating an actuatable apparatus enables a pattern associated with a component to be selectively revealed and concealed. The method steps include selecting a substrate including an obverse surface and an opposed reverse surface, one of the obverse surface and the reverse surface defining a transparent selected area; applying a selectively light-transmissive opaque covering to one of the obverse surface and the reverse surface to selectively enable and prevent transmission of light therethrough, the opaque covering disposed to intercept light directed through the selected area; adapting the opaque covering into first and second portions to collectively define a pattern associated with the selected area, the first portion having a first transmissivity to light to enable transmission of light therethrough, and the second portion having a second transmissivity to light to prevent or impede transmission of light therethrough; adapting the opaque covering to render the pattern invisible when an illumination source is in a non-illuminated state, and visible when an illumination source is in an illuminated state; and positioning adjacent the reverse surface an illumination source for illuminating the selected area, the illumination source actuatable between an illuminated state for transmitting light through the pattern to reveal the pattern, and a non-illuminated state for obscuring the selected area and concealing the pattern.

DESCRIPTION OF EMBODIMENTS OF THE INVENTION

Figure 1:
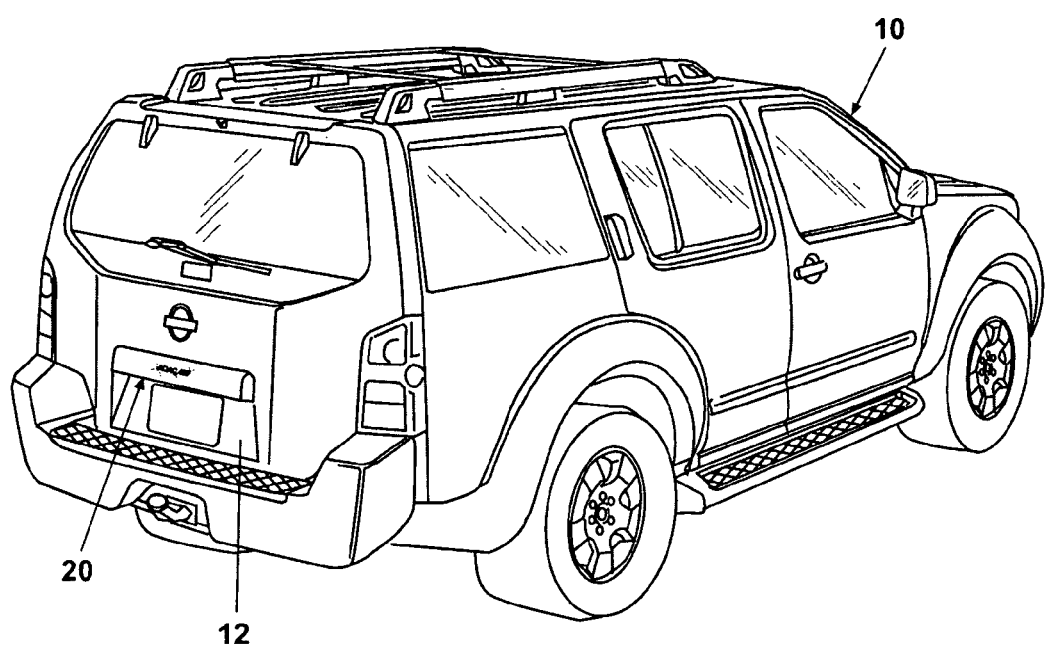
FIG. 1 is a perspective view of a vehicle having an external trim component according to one embodiment of the invention.

Referring now the figures, FIG. 1 illustrates a vehicle 10 with an exemplary vehicular trim component 20 with a concealed indicium according to the invention. The trim component 20 can be adapted to display indicia or other markings when the indicia or other markings are illuminated. When the indicia or other markings are not illuminated, they are completely undetectable by an observer, and the vehicular trim component 10 has an appearance identical to a trim component without any indicia or visual markings. As a result, the markings are hidden while not in use and do not detract from the physical appearance of the vehicle 10, and the trim component 20 is captivating and aesthetically pleasing when the markings are illuminated.

As utilized herein, the term "indicium" refers to any sort of marking that can be visually observed. Examples of indicia include, but are not limited to, logos, numerical and textual characters, symbols, designs, images, and pictures. An exemplary design can be a frit, which is commonly found on automotive glass and comprises a solid, opaque line or band and parallel lines of progressively smaller opaque dots for creating the illusion of a gradual fade from opaque to transparent. The indicia can be communicative, functional, decorative, interactive, or a combination thereof.

As utilized herein, the term "trim component" can refer to any component located on the exterior or interior surface of the vehicle. The vehicle can be an automobile or other type of motor powered vehicle, such as a motorcycle, a scooter, an all-terrain vehicle (ATV), a snowmobile, a wave runner, a jet ski, or a boat. The trim component can be decorative, functional, or a combination thereof. Examples of exterior trim components include, but are not limited to, body side moldings; spoilers; door handles; license plate frames; hood, side, and brake louvers; truck caps and covers; and bars, such as a lighting bar above the license plate and a bar for mounting a center high mount stop light (CHMSL). Additionally, the trim component can be adapted to provide lighting under the vehicle hood, hood cosmetic lighting, truck bed lighting, and flashing, strobe, or message lighting for emergency vehicles, such as ambulances, fire trucks, and police cruisers. Other examples of trim components include numerous custom accessories typically added to the vehicle 10 by the vehicle owner or a specialist hired by the vehicle owner as compared to the manufacturer of the vehicle. Examples of interior trim components include, but are not limited to interior door handles, bezels for interior door handles, instrument clusters, gauges, odometer and speedometer displays, warning lamps, shifting mechanism position indicator, radio controls/knobs, climate control displays and controls, cruise control displays and controls, steering wheel mounted accessory controls (i.e., radio and cruise control controls), interior vehicle badging (e.g., on instrument panel, door panels, steering wheel), accessory lighting, identification labels (e.g., for cup holders, power outlet covers, shift knobs, glove box door), visor lighting, and LCD or other types of flat panel displays, such as displays for sound systems, global positioning systems, and vehicular imaging systems. Additionally, the trim component can be adapted to provide trunk interior lighting, safety lighting on an interior surface of the door that illuminate when the door is opened, and headliner trim lighting, such as task, ambient, and mood lighting.

The trim component is not limited to vehicular trim components or use with vehicles. The invention as described herein can also be used in non-automotive applications, including those having control mechanisms for operation by the user and would benefit aesthetically by being concealed or hidden while not in use. Examples of such devices include, but are not limited to, appliances such as microwave ovens, clothes washers and dryers, ranges, stovetops, ovens, countertop kitchen appliances, and lawn and garden appliances, such as trimmers, edgers, blowers, snow blowers, and lawn mowers; audio and visual entertainment devices, such as stereo components, televisions, stationary and portable video game consoles, portable music players including MP3 players, CD players, and radios; portable personal computers including laptops and personal digital assistants (PDAs); remote controls; and calculators. The invention can also be utilized for non-interactive displays, such as house or building address numbers, advertisement signs, product displays in stores, and open/closed signs for businesses. Other examples of exterior house components suitable for use with the invention include soffits and soffit inserts (e.g. for concealing holiday or other decorative lighting), garage door panels, rain gutters, fencing and railings, and solar panel covers. The invention can also be employed in the interior of the home, such as with staircase hand rails and baseboards. Additionally, the invention can be incorporated with home security systems to conceal interior and/or exterior security cameras. Furthermore, it is also contemplated that the invention can be utilized with office furniture.

In general, the invention can be employed in numerous applications, only a few of which are described herein for brevity. The examples listed above are provided for exemplary purposes only and are not intended to limit the invention in any manner. The embodiments of the invention described below are for illustrative purposes only with respect to an automobile exterior trim component, with it being understood that the invention can also be employed in other applications, such as those described above.

The exemplary vehicular trim component 20 shown in FIG. 1 can be in the form of a license plate lighting bar positioned above a mounting location 12 for a license plate at a rear end of the vehicle 10. The trim component 20 is shown in more detail in FIGS. 2-7, and these figures illustrate elements of the trim component 20 related to the invention. It will be apparent to one of ordinary skill in the vehicular component art that the trim component 20 can comprise other elements that relate to other functions of the trim component 20.

Figure 2:
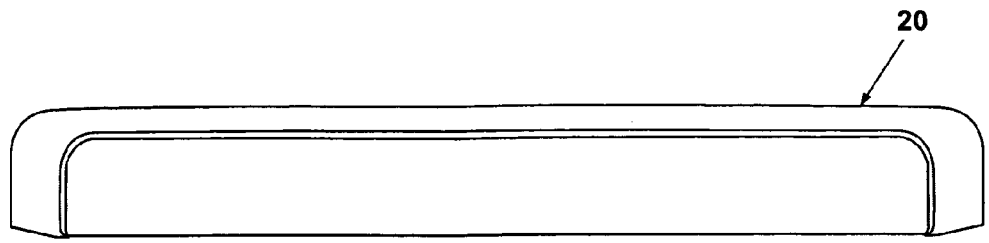
FIG. 2 is a front elevational view of the external trim component of FIG. 1 with a concealed indicium of the external trim component in a non-illuminated state.
Figure 3:
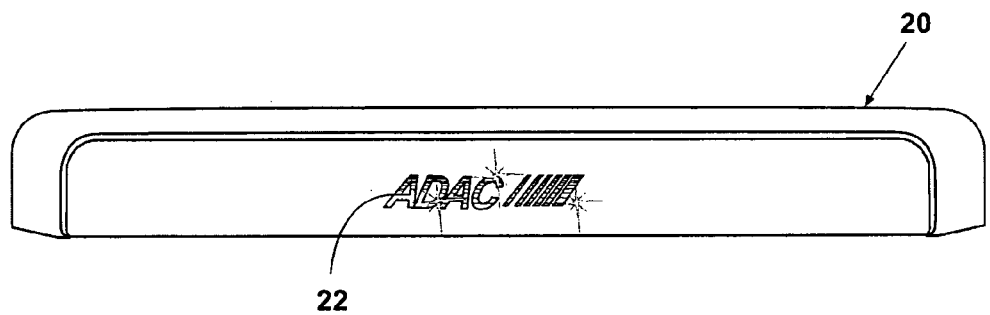
FIG. 3 is a front elevational view of the external trim component of FIG. 1 showing the indicium configured as a logo in an illuminated state.
Figure 4:
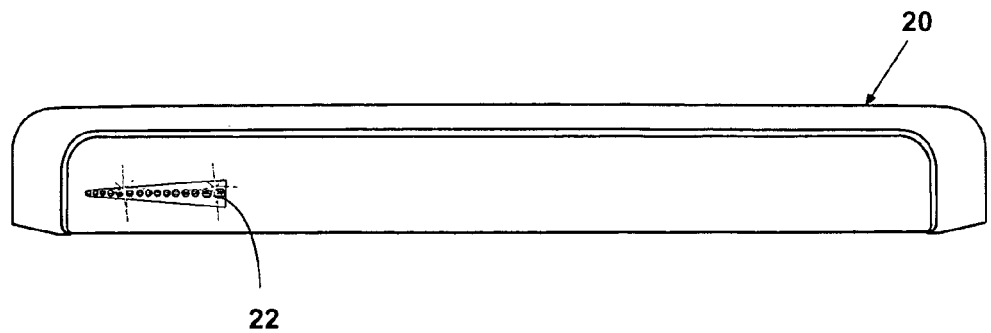
FIG. 4 is a front elevational view of the external trim component of FIG. 1 showing the indicium configured as a turn signal in an illuminated state.

FIG. 2 illustrates the trim component 20 in a non-illuminated state, wherein the trim component 20 appears as if it does not have any type of indicium thereon. However, when the trim component 20 is illuminated, an indicium 22 in an illuminated state can be viewed by an observer, as shown in FIG. 3. The exemplary indicium 22 of FIG. 3 can be a logo comprising textual characters and a design, and FIG. 4 illustrates another exemplary indicium 22 in the form of a turn signal. The indicium 22 can be preferably sized so that it can be viewed from a reasonable distance and can be positioned in any suitable location on the trim component 20.

Figure 5:
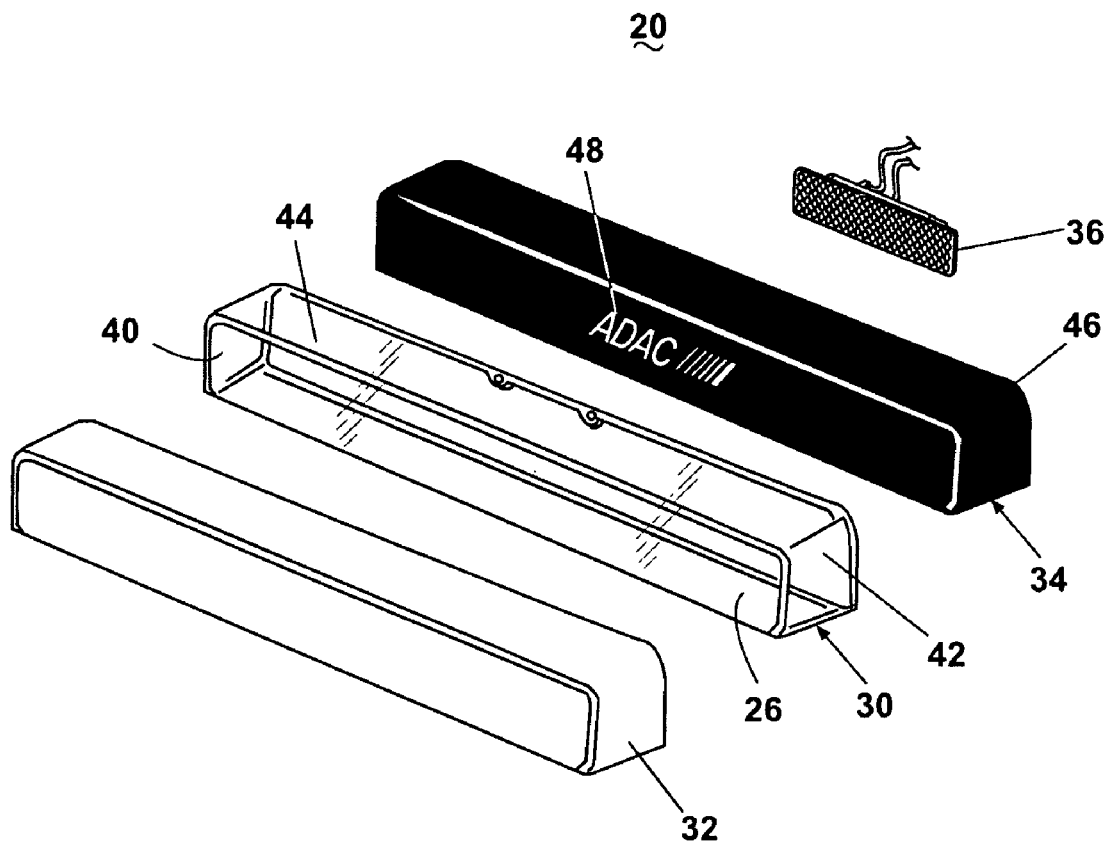
FIG. 5 is an exploded, perspective view of the external trim component of FIGS. 1-4.
Figure 6:
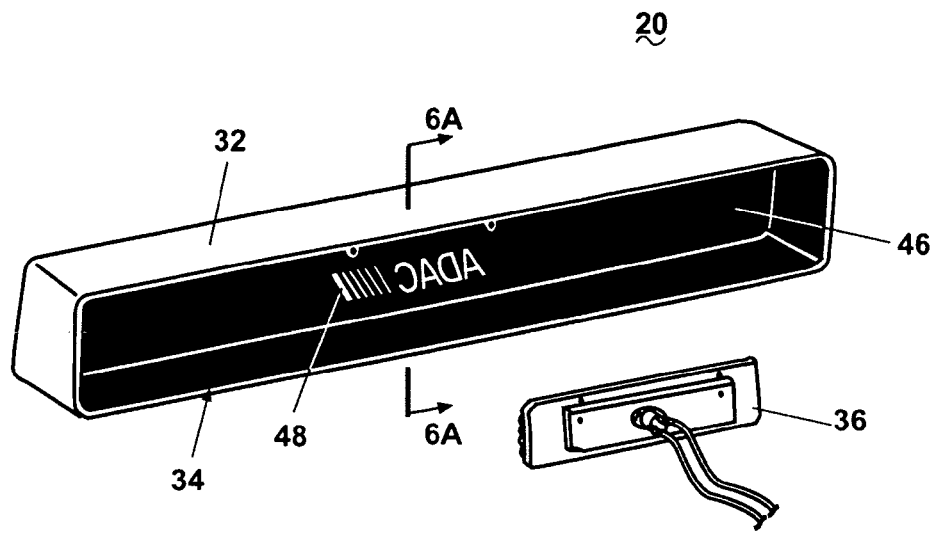
FIG. 6 is an exploded, perspective view from a rearward direction of the external trim component of FIGS. 1-4 showing a mask inside the external trim component.
Figure 6A:
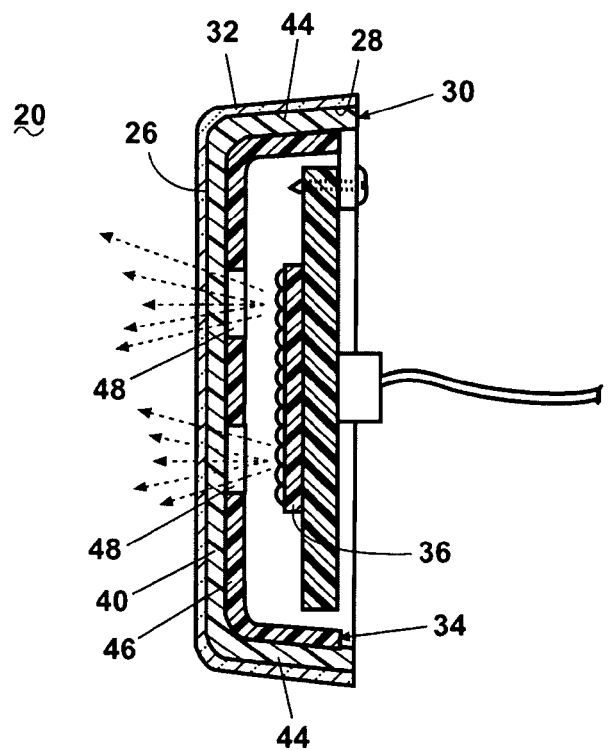
FIG. 6A is a cross-sectional view taken along line 6A-6A of FIG. 6.

Referring now to FIGS. 5-6A, a first embodiment of the trim component 20 comprises a substrate 30 having an external surface 26 and an internal surface 28. The substrate has a finish layer 32 on the external surface 26, and a mask 34, which defines the indicium 22, and an illumination source 36 of the trim component 20 are located on a side of the substrate 30 facing the inside surface 28. In this application, the terms "forward" and "rearward" refer to orientations towards and away from, respectively, the vehicle 10 when the trim component 20 is mounted to the vehicle 10 or, more generically, to the sides of the substrate 30 closer to and farther away from, respectively, the illumination source 36. For example, the external surface 26 can be on the forward side of the substrate 30, and the internal surface 28 can be on the rearward side of the substrate 30. The substrate 30 of the exemplary trim component 20 of the present embodiment comprises a face 40 and pairs of opposing side walls 42 and upper and lower walls 44 extending rearward from and generally orthogonally relative to the face 40.

The substrate 30 provides a base for the trim component 20 and, according to one embodiment, can be made of polymeric material. Exemplary polymeric materials include silicone and nylon. Alternatively, the substrate 30 can be made of glass or any other suitable material. For example, the substrate 30 can be at least partially made of a conductive material whose optical characteristics, such as opacity, change when an electrical charge is applied thereto. The substrate 30 can comprise any suitable wall thickness, which can be the distance between the external surface 26 and the internal surface 28, to render the substrate 30 rigid or flexible depending on the selected characteristics for the trim component 20. For example, the substrate 30 can be in the form of a flexible film. Additionally, the substrate 30 according to one embodiment of the invention can be translucent or sufficiently transparent such that the substrate 30 transmits light without significant blurring or distortion. Further, the substrate 30 can be made of a clear material tinted to give a selected visual effect, such as a smoky or amber appearance, to achieve a selected color, to achieve a selected light color output, or to hide electronics, which are discussed in more detail below.

The finish layer 32 on the forward side of the substrate 30 conceals the mask 34 and the illumination source 36 when the illumination source 36 is not illuminated and provides the trim component 20 with a selected external appearance. Additionally, the finish layer 32 can be substantially opaque when viewed from the forward side of the trim component 20 to conceal the illumination source 36, the mask 34, or any other components on the rearward side of the finish layer 32 when the illumination source 36 is not illuminated. However, the finish layer 32 transmits light generated from the illumination source 36 on the rearward side thereof so that an observer can view light from the illumination source 36 and thereby view the indicium 22 when the illumination source 36 is in an illuminated state. Further, the finish layer 32 hides the illumination source 36 and the mask 34 when the illumination source 36 is in a non-illuminated state and thereby gives the trim component 20 an appearance identical to a trim component without an indicium. According to one embodiment of the invention, the finish layer 32 can be selected so that the appearance of the trim component 20 can be similar to the appearance of portions of the vehicle 10 adjacent to the trim component 20; therefore, the finish layer 32 enables the trim component 10 to effectively "blend in" with adjacent portions of the vehicle 10 when the illumination source 36 is not illuminated to create a selected aesthetic appearance.

In addition to providing selected optical characteristics, the finish layer 32 can be texturized to create selected visual and tactile characteristics. For example, the textured finish can create a selected light output, such as by filtering or diffusing light from the illumination source 36. Furthermore, the textured finish can have a texture different than the texture of the adjacent areas of the vehicle 10 so that an observer can identify and differentiate the trim component 20 from the rest of the vehicle 10 when the trim component 20 otherwise "blends in" with the vehicle 10.

The finish layer 32 can be fabricated of any material(s) and can have any form suitable to impart the optical characteristics described above. The selected optical characteristics of the finish layer 32, such as light transmissivity, can be controlled by selective control of finish properties such as chemical composition, color, applied thickness, and the like. The wavelength of the light emitted by the illumination source 36 will also control the transmissivity of the finish layer 32.

According to one embodiment, the finish layer 32 can be a coating applied to the substrate 30. Exemplary coating materials include, but are not limited to paints, including metallic paints, such as Ghost Chrome® paint available from Alsa Corporation. Other suitable paints include automotive and non-automotive grade paints, which can be applied with a spraying process. The paint can be applied in accordance with the particular thickness required to achieve the selected optical characteristics for the finish layer 32 and to avoid excessive deposition of the paint. Optionally, tint can be added to the paint to achieve a selected color, such as to match the trim component 20 to the vehicle 10, and the paint can be coated with a protective clear coat, which can also be tinted to achieve a selected color. The coating can also be in the form of a metal, such as aluminum or chromium, deposited onto the trim component 20 utilizing any suitable metal deposition process.

Alternatively, the finish layer 32 can comprise a separate component made of or coated with a material having the characteristics described above. For example, the finish layer 32 can be a thin film made of a suitable material, such as a polymeric material or a fabric material, laid on the substrate 30 to provide a selected cosmetic appearance and to impart the selected optical characteristics for the trim component 20. The film can be a solid color or can include a pattern or image. Another exemplary process for applying a film to the substrate 30 can be a hydrographic process in which a film having a selected appearance, such as a simulated carbon fiber appearance, is floated on liquid, and the substrate 30 can be dipped into the liquid such that the film attaches to the substrate 30 when the substrate 30 is removed from the liquid. Alternatively, the film can be insert molded with the substrate 30. In this process, the film can be inserted into a mold cavity, and then the mold can be closed for injection of material to form the substrate 30. The film and the substrate 30 become a single component, with the film functioning as a cosmetic outer skin of the substrate 30.

According to another embodiment of the invention, the finish layer 32 can be integrated with the substrate 30. For example, the substrate 30 can be molded of a polymer having a selected color, and the wall thickness of the substrate 30 can be selected to achieve the optical characteristics required of the finish layer 32. Thus, the substrate 30 in this case functions both as the base for the trim component 20 and as the finish layer 32 for the trim component 20.

The mask 34 comprises a masked portion 46 and an unmasked portion 48 that transmits more light than the masked portion 46 and defines the indicium 22. The finish extends across both the masked portion 46 and the unmasked portion 48 to conceal visible differences between the masked portion 46 and the unmasked portion 48 when the illumination source 36 is not illuminated. Thus, the indicium 22 is not visually discernible when the illumination source is in the non-illuminated state. In the current embodiment, the mask 34 can be designed so that the unmasked portion 48 can be aligned with the face 40 of the substrate 30, but it is within the scope of the invention for the unmasked portion 48 to be located anywhere on the mask 34 corresponding to any location of the substrate 30. Furthermore, the mask 34 is illustrated in the figures as being applied to the internal surface 28 of the substrate 30; however, the mask 34 can be located on the external surface 26 of the substrate 30 or in any other suitable location of the trim component 20.

According to one embodiment, the masked portion 46 can be black to ensure that light from the illumination source 36 located on the rearward side of the mask 34 only passes through the unmasked portion 48, which can be generally translucent, transparent, or hollow (i.e., an opening or aperture). As a result, when the illumination source 36 is illuminated, light shines through the unmasked portion 48, the substrate 30, and the finish layer 32 to render the indicium 22 visible to the observer, as shown in FIG. 6A. Alternatively, the opacities of the masked and unmasked portions 46, 48 can be selected so that the light shines through both the masked and unmasked portions 46, 48 but at different intensities so that the indicium 22 can be visually discernible. The unmasked portion 48 can optionally be colored so that the light that shines therethrough is similarly colored to give the indicium 22 a selected appearance.

The mask 34 can be made of any materials(s) and have any form suitable to create the masked portion 46 and the unmasked portion 48. The mask 34 can be, for example, a separate component made of an opaque material, such as a polymeric material or a fabric, with the unmasked portion 48 formed by material removed therefrom, or the mask 34 can be a separate component with an opaque coating thereon. Alternatively, the mask 34 can be a coating, such as paint, applied to the substrate 30 or the finish layer 32, or the mask 34 can be a film mounted to the substrate 30 or the finish layer 32 by an adhesive or the like. The mask 34 can also be formed integrally with the substrate 30, such as by removing material from the substrate 30 to form thin walled portions that allow light to pass through when backlit by the illumination source 36 or by molding the substrate 30 with a mold having a design that incorporates the thin walled portions. In these examples, the thin walled portions form the unmasked portion 48 of the mask 34.

Many different methods can be employed for manufacturing the mask 34. For example, the mask 34 can be applied with printing processes, such as screen printing processes (e.g. silk screening), where ink or other material can be passed through a screen to a surface, or printing pad processes, where ink or other material can be transferred from an ink pad to a surface using a stamp. In screen printing and printing pad processes, the screen and the pad are designed in accordance with the indicium 22. Alternatively, the mask 34 can be produced with a two shot molding process, wherein multiple resins can be injected into a single mold to create the masked and unmasked portions 46, 48. In a related process, insert/over molding, a solid clear component can be inserted into a mold, and opaque material, such as resin, can be injected around the clear component. The portions of the clear component that are not covered by the opaque material form the unmasked portion 48, and the opaque material forms the masked portion 46. Alternatively, the mask 34 can be made by molding a single component, which can be the substrate 30, as described above, or a component separate from the substrate 30, having portions with walls that are thin relative to the rest of the molding to form the unmasked portion 48.

Other methods, such as laser etching and CNC machining processes, for example, involve removing material to form the unmasked portion 48. In laser etching, an opaque coating, such as paint, can be applied to the substrate 30 or a separate structural component to form the masked portion 46, and a laser removes the paint to form the unmasked portion 48. CNC machining processes are well-known processes that can be used to remove, such as by cutting or milling, material from a component to form the unmasked portion 48. The material can be completely removed to form the unmasked portion 48 or can be sufficiently thinned to allow light to pass through when the illumination source 36 is illuminated.

The illumination source 36 can be positioned on the rearward side of the substrate 30, the finish layer 32, and the mask 34 and generates light that transmits through the unmasked portion 48 of the mask 34, the substrate 30, and the finish layer 32 to provide a visible distinction between the masked portion 46 and the unmasked portion 48 of the mask 34 and thereby render the indicium 22 visually discernable to the observer. The illumination source 36 can be mounted to the trim component 20 or can be mounted to an outer surface of the vehicle 10 behind the trim component 20. The illumination source 36 can be any suitable light generating device, including, but not limited to, one or more light emitting diodes (LED), organic light emitting diodes (OLED), electroluminescent sources (e.g. light pads), incandescent light bulbs, fluorescent light bulbs, neon lights, and lasers. Another example of an illumination source is a display screen, such as a liquid crystal display (LCD) or plasma display. Further, the illumination source 36 can comprise light pipes and fiber optics that receive light from a remote light source and distribute the light. Additionally, the illumination source 36 can be white or colored and can comprise multiple light sources of differing colors.

The illumination source 36 can be connected to an electrical system of the vehicle 10, and can remain continuously in an illuminated state, or adapted to alternate between the illuminated state and the non-illuminated state in response to one or more conditions of the vehicle 10 or its environment. For example, the illumination source 36 can be adapted to illuminate when the user actuates the ignition, actuates a turn signal switch, brakes, accelerates, actuates a remote fob for a keyless entry system, touches an entry handle, or when an observer is within a predetermined distance from the vehicle 10. Further, the illumination source 36 can be voice activated by the user. Optionally, the illumination source 36 can operate in a plurality of illumination states, wherein the intensity of the light from the illumination source 36 can be different for each illumination state. For example, the illumination states can comprise a standby illumination state wherein the intensity of the light from the illumination source 36 can be less than during an active illumination state.

According to another embodiment of the invention, the illumination source 36 can be adapted to form the mask 34. For example, an electroluminescent pad can be shaped according to the indicium 22, or a coating can be applied to the pad to effectively create a mask or stencil on the pad and define areas through which light can pass. Alternatively, a plurality of LEDs can be configured in a shape corresponding to the indicium 22. According to another embodiment of the invention, optics, such as light pipes and fiber optics, that effectively form the mask 34 can be molded in the substrate 30. The optics collect light from the illumination source 36 and project the light in a pattern corresponding to the indicium 22.

The trim component 20 can further comprise electronics (not shown), such as switches and sensors for receiving input from the user. For example, the trim component 20 can comprise a membrane switch, or capacitance or field effect sensors, that generate a signal upon actuation thereof by the user. Furthermore, the electronics can comprise the aforementioned display screen, which can be used, for example, in conjunction with a global positioning system and/or a computer in the vehicle 10. An example of a trim component in the form of a door handle employing such electronics is described below with respect to FIG. 12.

As described above, when the illumination source 36 is in the non-illuminated state, the trim component 20 has an appearance substantially identical to a trim component without an indicium, as shown in FIG. 2. When the illumination source 36 is in the illuminated state, light from the illumination source 36 transmits through the unmasked portion 48 of the mask 34 while less or no light transmits through the masked portion 46, as depicted in FIG. 6A. The light that shines through the unmasked portion 48 also transmits through the face 40 of the substrate 30 and the finish layer 32 on the external surface 26 of the substrate 30 so that the observer can perceive the indicium 22, as illustrated in FIG. 3 or 4. Consequently, the finish layer 32 hides the mask 34 and thereby the indicium 22 when in the non-illuminated state, and the indicium 22 is not only viewable, but has an attractive appearance when in the illuminated state.

Figure 7:
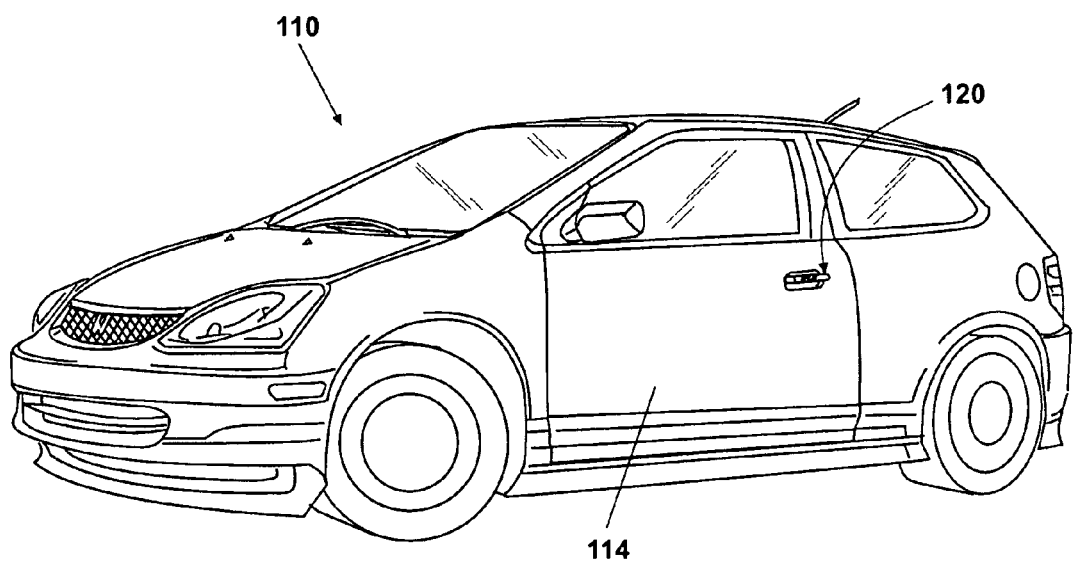
FIG. 7 is a perspective view of a vehicle having an alternative embodiment of an external trim component.

A vehicle 110 with a second embodiment of a trim component 120 according to the invention is illustrated in FIG. 7, and the trim component 120 is shown in further detail in FIGS. 8-11, where components similar to those of the first embodiment are identified with like numerals in the form 1XX, where XX is the numerical identifier of the components for the first embodiment. The second embodiment trim component 120 can be a vehicular door handle mounted to an exterior surface of a door 114 of the vehicle 110.

Figure 8:
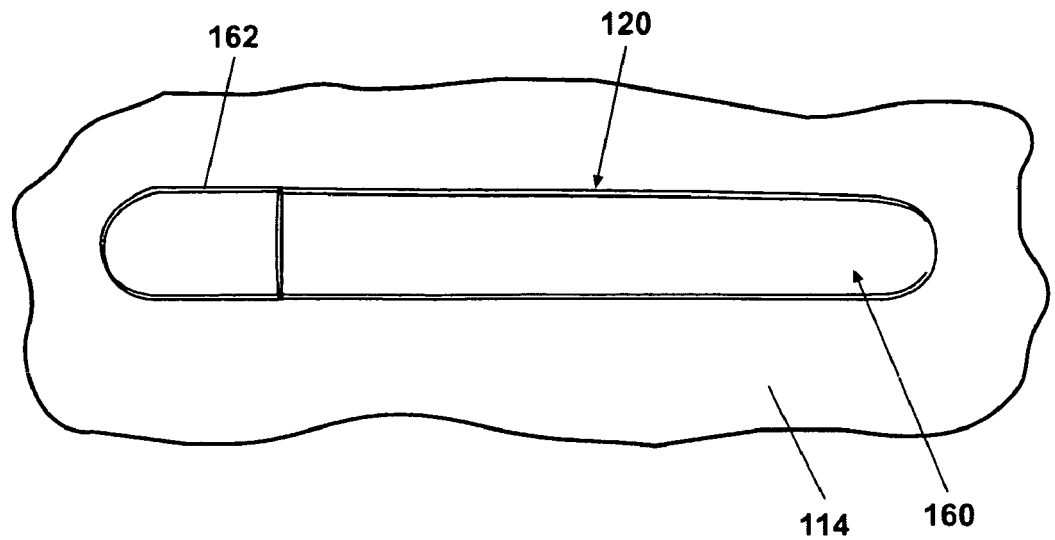
FIG. 8 is a front elevational view of the alternative embodiment of the external trim component of FIG. 7 with a concealed indicium in a non-illuminated state.
Figure 9:
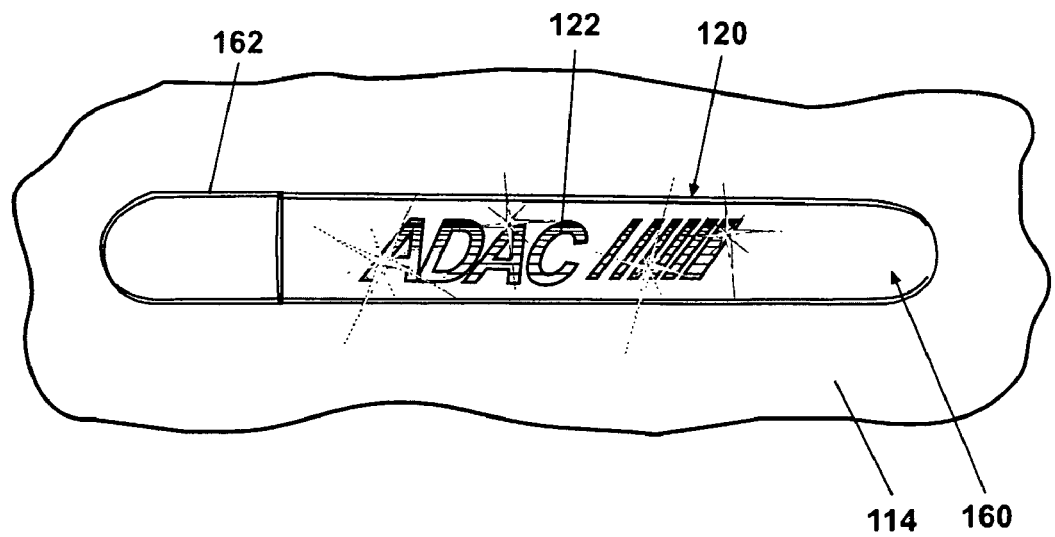
FIG. 9 is a front elevational view of the alternative embodiment of the external trim component of FIG. 7 with the indicium configured as a logo in an illuminated state.

FIG. 8 illustrates the trim component 120 in a non-illuminated state, wherein the trim component 120 appears as if it does not have any type of indicium thereon. However, when the trim component 120 is illuminated, an indicium 122 in an illuminated state can be viewed by an observer, as shown in FIG. 9. The exemplary indicium 122 of FIG. 9 can be a logo comprising textual characters and a design.

Figure 10:
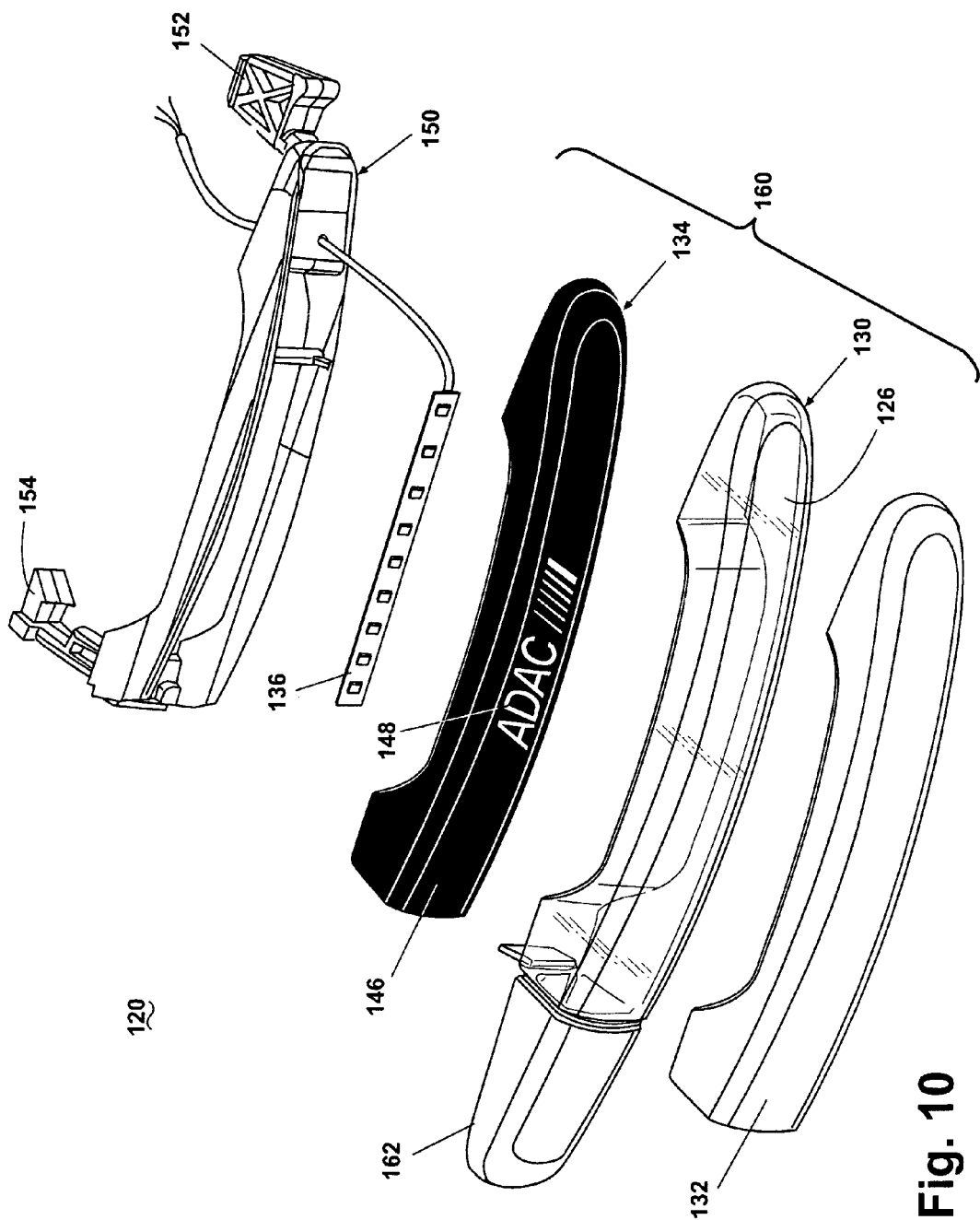
FIG. 10 is an exploded, perspective view of the alternative embodiment of the external trim component of FIGS. 7-9.
Figure 11:
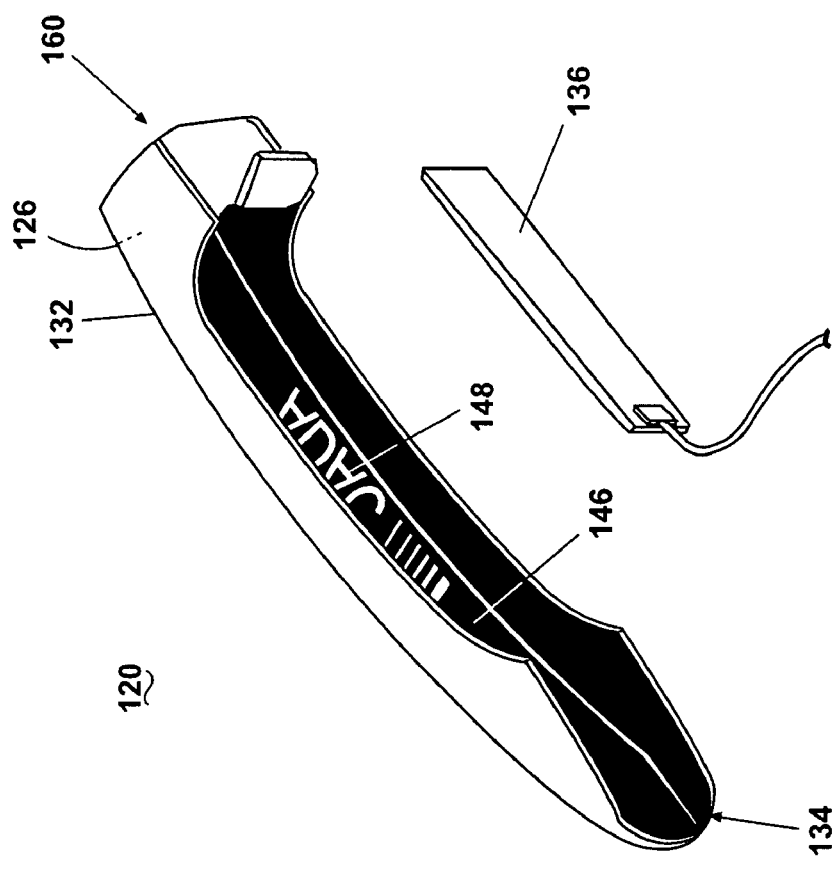
FIG. 11 is an exploded, perspective view from a rearward direction of the alternative embodiment of the external trim component of FIGS. 1-4 showing a mask inside the external trim component.

Referring additionally to FIGS. 10 and 11, the trim component 120 in the form of the door handle comprises a handle base 150, a handle cap 160 removably mounted to the handle base 150, and a bezel 162 mounted on the door 114 adjacent the handle base 150 and the handle cap 160. It will be apparent to one of ordinary skill in the vehicular component art that the trim component 120 can comprise other elements that relate to other functions of the door handle. Exemplary door handles are disclosed in U.S. patent application Ser. No. 10/710,806, which is incorporated herein by reference in its entirety.

The handle base 150 can be mounted to an external surface of the door 114 and comprises a pivot mount 152 at one end thereof for pivotally mounting the handle base 150 to the door 114 and a latch actuator 154 at an opposite end 152. The pivot mount 152 and the latch actuator 154 are positioned inside the door 114 such that they are not visible from the exterior of the vehicle 110. The latch actuator 154 can be operatively coupled to a door latch (not shown) in any suitable manner, and displacement of the latch actuator 154 during pivotal movement of the housing body 150 about the pivot mount 152 releases the door latch so that the user can open the door 114 and enter the vehicle 110.

The handle cap 160 can be mounted to a forward surface of the handle base 150 to provide a selected external appearance to the trim component 120. When the user grasps the trim component 120 to pivot the handle base 150 and release the door latch, the user grasps both the handle base 150 and the handle cap 160. Similar to the trim component 20 of the first embodiment, the handle cap 160 comprises a substrate 130 with a finish 132 on an external surface 126 and a mask 134 on an internal surface 128. The trim component 120 further comprises an illumination source 136 located between the handle cap 160 and the handle base 150. The substrate 130, the finish 132, the mask 134, and the illumination source 136 are similar to the corresponding components of the first embodiment and function in the same manner with respect to the indicium 122 and its visibility to an observer.

According to one embodiment, the handle cap 160 can be removably mounted to the handle base 150 and can be exchanged with a replacement handle cap 160 having a different indicium 122 thereon. Because the handle cap 160 can be replaced, the user can personalize the trim component 120 with a personalized handle cap having a personalized indicium on the corresponding mask. Furthermore, the manufacture and assembly of the trim component 120 can be facilitated by the replaceable nature of the handle cap 160; the handle cap 160 can be the only part of the trim component 120 that needs to be custom made for a particular make or model of vehicle. When replacing the handle cap 160, the entire handle cap 160 can be removed and exchanged. Alternatively, if the mask 134 is not integral with the substrate 130, then only the mask 134 has to be removed and exchanged.

Figure 12:
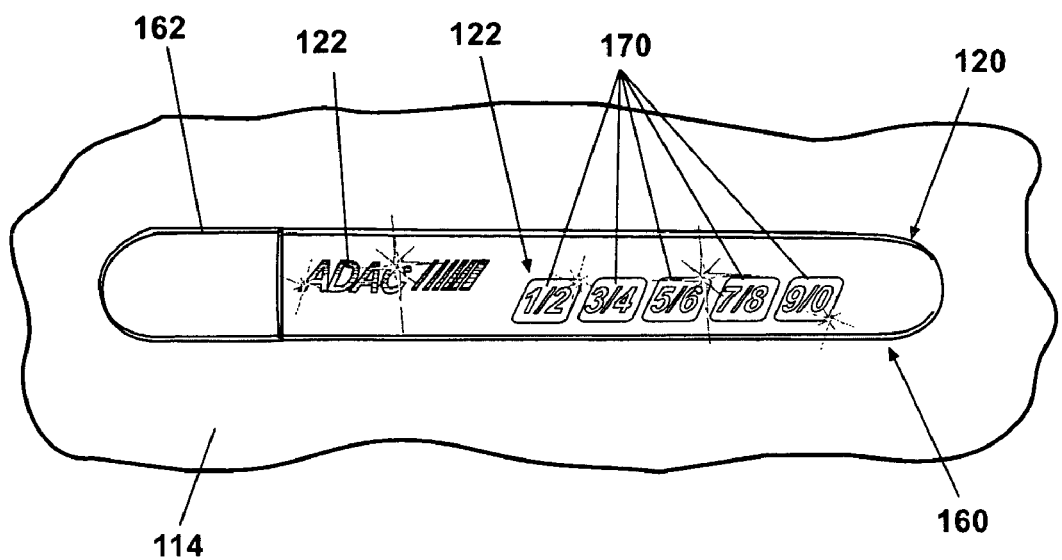
FIG. 12 is a front elevational view of the alternative embodiment of the external trim component of FIG. 7 with the indicium configured as a logo as well as a keyless entry pad, both shown in an illuminated state.

Optionally, the indicium 122 can be integrated with a keypad of a keyless entry system, as shown in FIG. 12. Exemplary vehicular door handles with such a keypad are disclosed in U.S. Patent Application No. 60/522,663 and in U.S. Patent Application Publication No. 2003/0031025, which are incorporated herein by reference in their entirety. The indicium 122 comprises the keypad, which has individual keys 170 that are touched by a user in a predetermined sequence to unlock a lock mechanism (not shown) of the keyless entry system so that the user can grasp and pull the trim component 120 to release the door latch. The keys 170 provide a visual indicator that identifies the location(s) on the trim component 120 that the user must touch to operate the keyless entry system. The keys 170 can be associated with electronics in the form of a switch or sensor, such as a membrane switch, a capacitance sensor, or a field effect sensor, positioned behind the keys 170 and capable of sensing the presence of the user's finger when the user touches the keys 170. Thus, when the user touches the keys 170 of the trim component, the electronics detect the presence of the user's finger, and when the user touches the keys 170 in the predetermined sequence, the electronics operably communicates with the lock mechanism to unlock the door. The keys 170 are viewable by the user when they are in the illuminated state, as illustrated in FIG. 12, and are advantageously not discernable when in the non-illuminated state. Alternatively, the keys 170 can be located on an escutcheon positioned behind the handle base 150 and the handle cap 160 or on an external panel of the door 114. The concept of utilizing the indicium 122 as a visual indicator that identifies one or more locations on the trim component 120 that a user must touch for activating electronics, such as the above mentioned switches and sensors, can be employed for applications other than keyless entry systems.

While the second embodiment trim component 120 has been described with respect to a strap-type door handle, the trim component 120 is not limited to such a door handle. The trim component 120 can comprise any suitable type of door handle, such as paddle handles and other types of handles known to one of ordinary skill in the vehicular component art.

Figure 13:
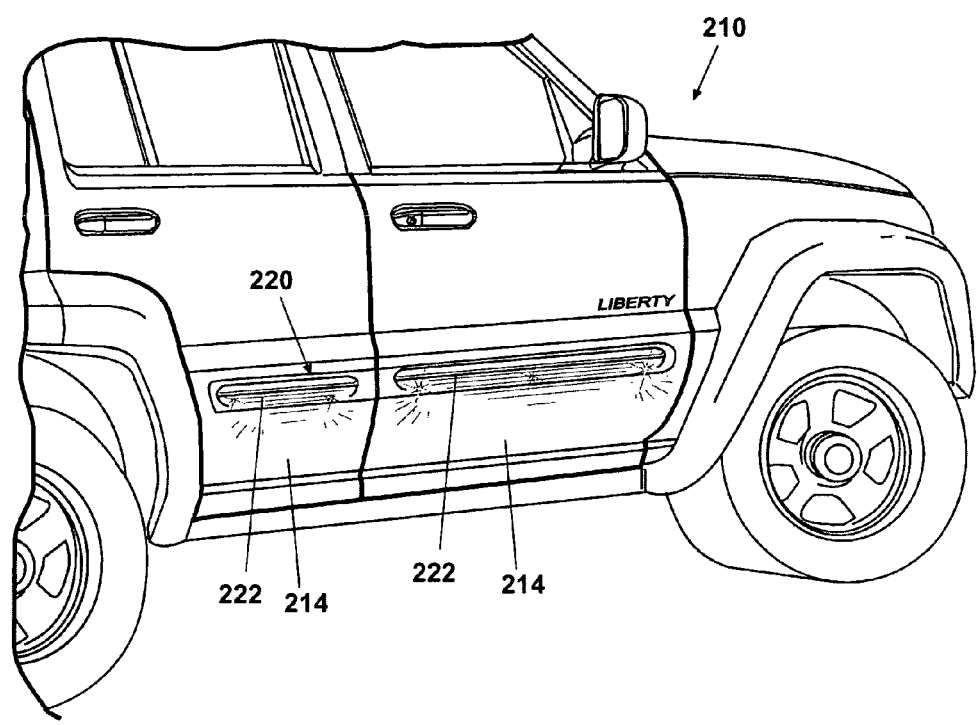
FIG. 13 is a perspective view of a vehicle having an alternative embodiment of an external trim component wherein the indicium is configured as a safety light.
Figure 14:
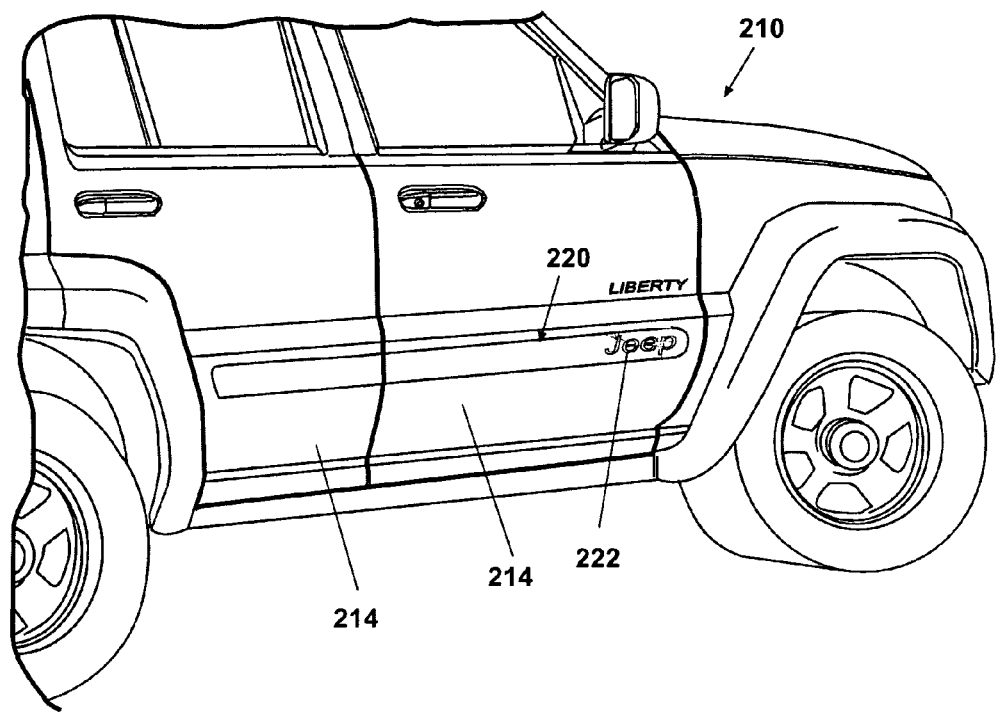
FIG. 14 is a perspective view similar to FIG. 13, wherein the indicium is configured as a logo.
Figure 15:
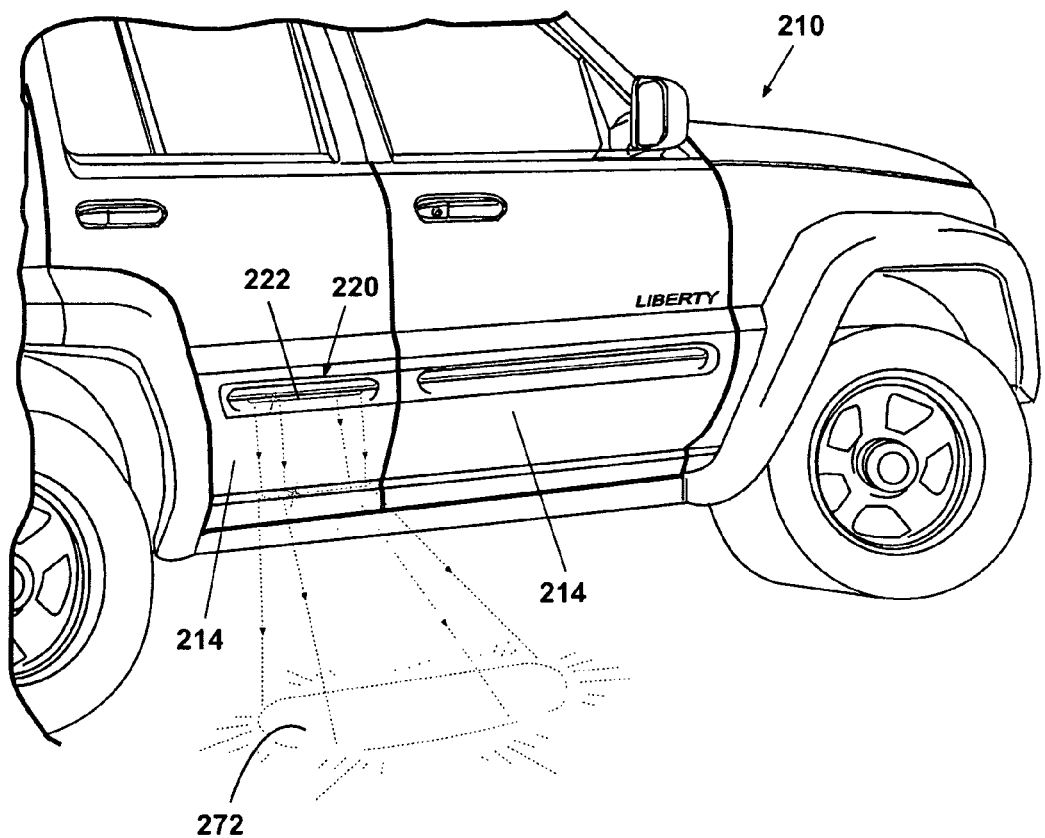
FIG. 15 is a perspective view similar to FIG. 13, wherein the indicium is configured as a puddle light.
Figure 16:
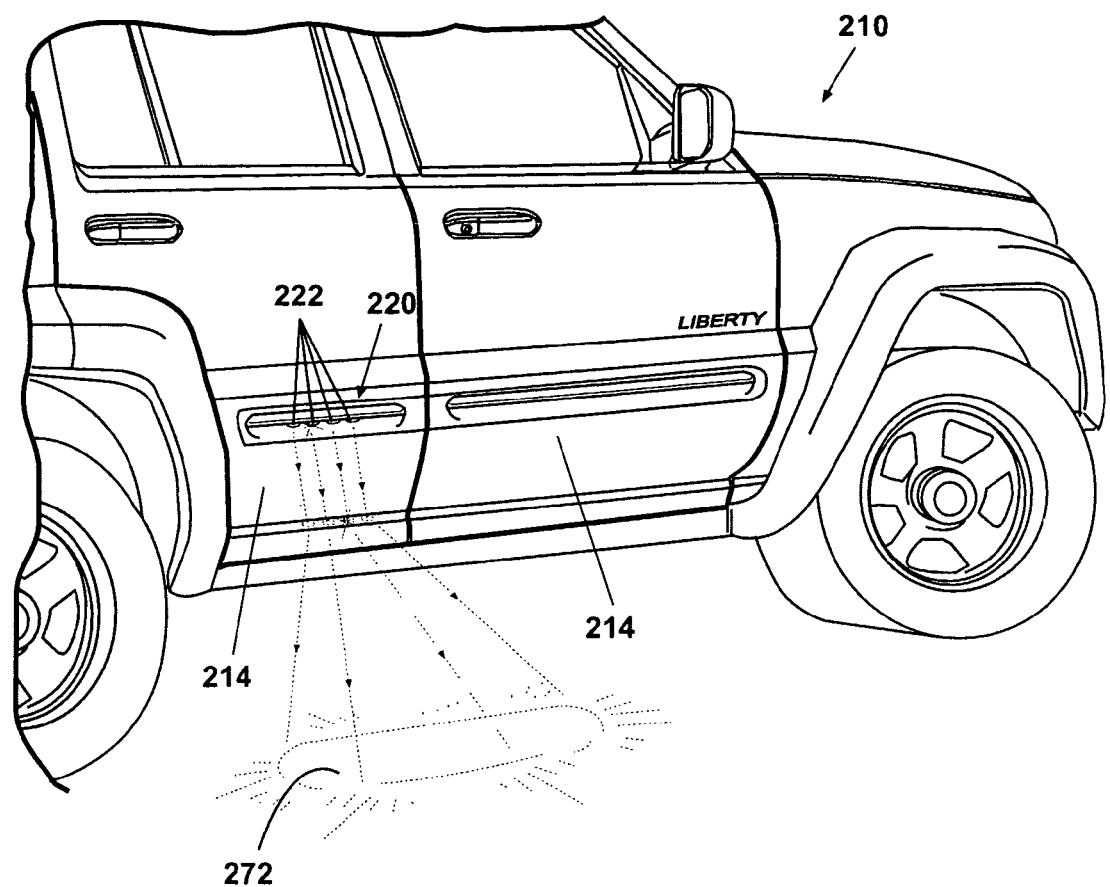
FIG. 16 is a perspective view similar to FIG. 15, wherein the indicium is configured as another type of puddle light.

Examples of other embodiments of trim components with concealed indicium according to the invention are illustrated in FIGS. 13-16. Components similar to those of the first embodiment are identified with like numerals in the form 2XX, where XX is the numerical identifier of the components for the first embodiment. FIGS. 13-16 show a vehicle 210 with a trim component 220 in the form of a bar integrated into side doors 214 of the vehicle 210. In FIG. 13, an indicium 222 functions as a safety side light that increases the visibility of the vehicle 210 when in the illuminated state, and the indicium in FIG. 14 can be configured as a logo. Additionally, the indicium 222 of FIGS. 13 and 14 can also function as a turn signal indicator that flashes when the driver actuates a control lever inside the vehicle 210. In FIGS. 15 and 16, the indicium 222 can be configured as a security or puddle light that illuminates a ground area 272 adjacent the vehicle 210 when in the illuminated state. The illuminated state can be achieved upon actuation of a remote keyless entry fob or by any other suitable event. The indicium 222 of FIG. 15 can be a single, elongated puddle light, while the indicium 222 of FIG. 22 comprises a plurality of shorter disconnected segments that together form the puddle light.

The relative positioning of the substrate 30, the finish layer 32, and the mask 34 of the trim components 20, 120 described herein can be altered in any reasonable fashion. For example, the mask 34 can be positioned forward of the substrate 30, or the finish layer 32 can be positioned between the substrate 30 and the mask 34. Additionally, the finish layer 32 can be located on the internal surface 28 of the substrate, and the mask can be applied to the finish layer 32. Furthermore, the trim component 20, 120 according to the invention does not have to include the mask 34. For example, light from the illumination source 36 can be transmitted through the entire substrate 30. Alternatively, the trim component can comprise an illumination source that focuses light on certain regions of the trim component. For example, an LCD display positioned behind the substrate 30 includes its own focused illumination source, and the LCD display becomes visible through the substrate 30 and the finish layer 32 when in the powered state, yet can be concealed by the finish layer 32 when not powered.

Figure 17A:
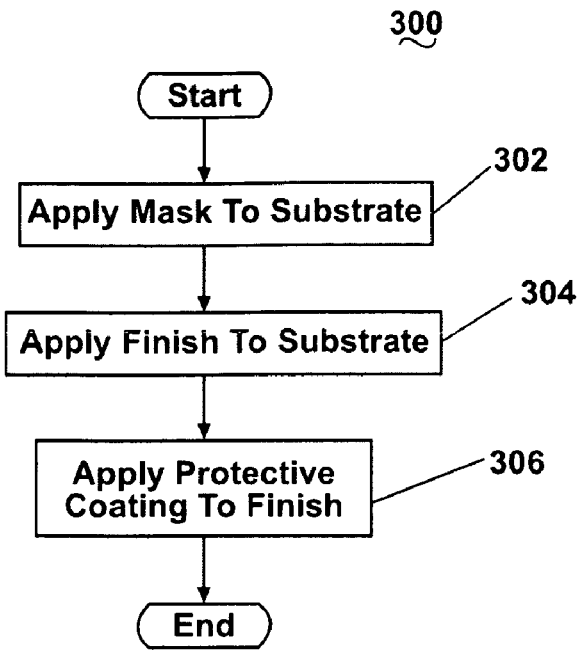
FIGS. 17A and 17B are exemplary flowcharts of methods for producing a substrate, a finish, and a mask of any of the several embodiments of the trim component with concealed indicium.
Figure 17B:
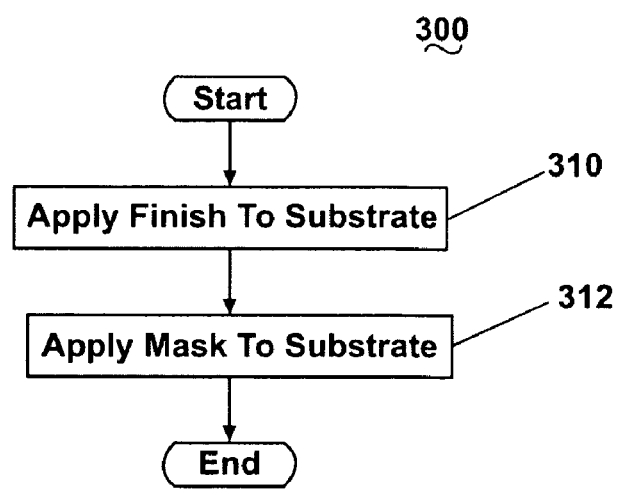

Exemplary flow charts of methods 300 for producing the combination substrate, finish, and mask of any of the embodiments of the trim component according to the invention are shown in FIGS. 17A and 17B. The method 300 illustrated in FIG. 17A begins by applying the mask 34 to the substrate 30 in step 302. The mask 34 can be applied to the front side of the substrate 30 or to the rear side of the substrate 30. According to one embodiment, the mask 34 can be applied by positioning a stencil in the form of the indicium 22 on the substrate 30, spraying or otherwise applying an opaque coating, such as a black paint, to the substrate 30, and then removing the stencil. Next, the finish layer 32 can be applied to the substrate 30 on the side opposite the mask 34 in step 304. According to one embodiment, the finish layer 32 can be applied by coating the substrate 30 with a paint, such as the aforementioned Ghost Chrome. In the case where the mask 34 can be applied to the rear side of the substrate 30, the finish layer 32 can be applied to the front side of the substrate 30. After the finish layer 32 is applied, a protective coating, such as a clear coat, can optionally be applied to the finish layer 32 in step 306. In the method 300 of FIG. 17A, steps 302 and 304 can occur in reverse order.

The method 300 described above produces the substrate 30 with the finish layer 32 and the mask 34 on opposite sides thereof. Alternatively, the method 300 can be altered as shown in FIG. 17B to produce the substrate 30 with the finish layer 32 and the mask 34 on the same side of the substrate 30. To begin the method 300 in FIG. 17B, the finish layer 32 can be applied to the substrate 30, such as on the rear side of the substrate 30, in step 310. According to one embodiment, the finish layer 32 can be applied to the rear side of the substrate 30 by coating the rear side of the substrate 30 with paint, such as the aforementioned Ghost Chrome. Next, the mask 34 can be applied to the finish layer 32 in step 312. According to one embodiment, the mask 34 can be applied by positioning a stencil in the form of the indicium 22 on the rear side of the finish layer 32, spraying or otherwise applying an opaque coating, such as a black paint, to the finish layer 32, and then removing the stencil.

The vehicular trim components with a concealed indicium according to the invention advantageously conceal indicia and an illumination source when in the non-illuminated state, and provide a captivating appearance to the indicia when in the illuminated state. As a result, indicia that do not contribute to the aesthetic appearance of the vehicle are hidden when not in use. Additionally, the visually attractive indicia can function as effective advertising media and provide a vehicle owner with creative options for personalizing the vehicle.

Figure 18:
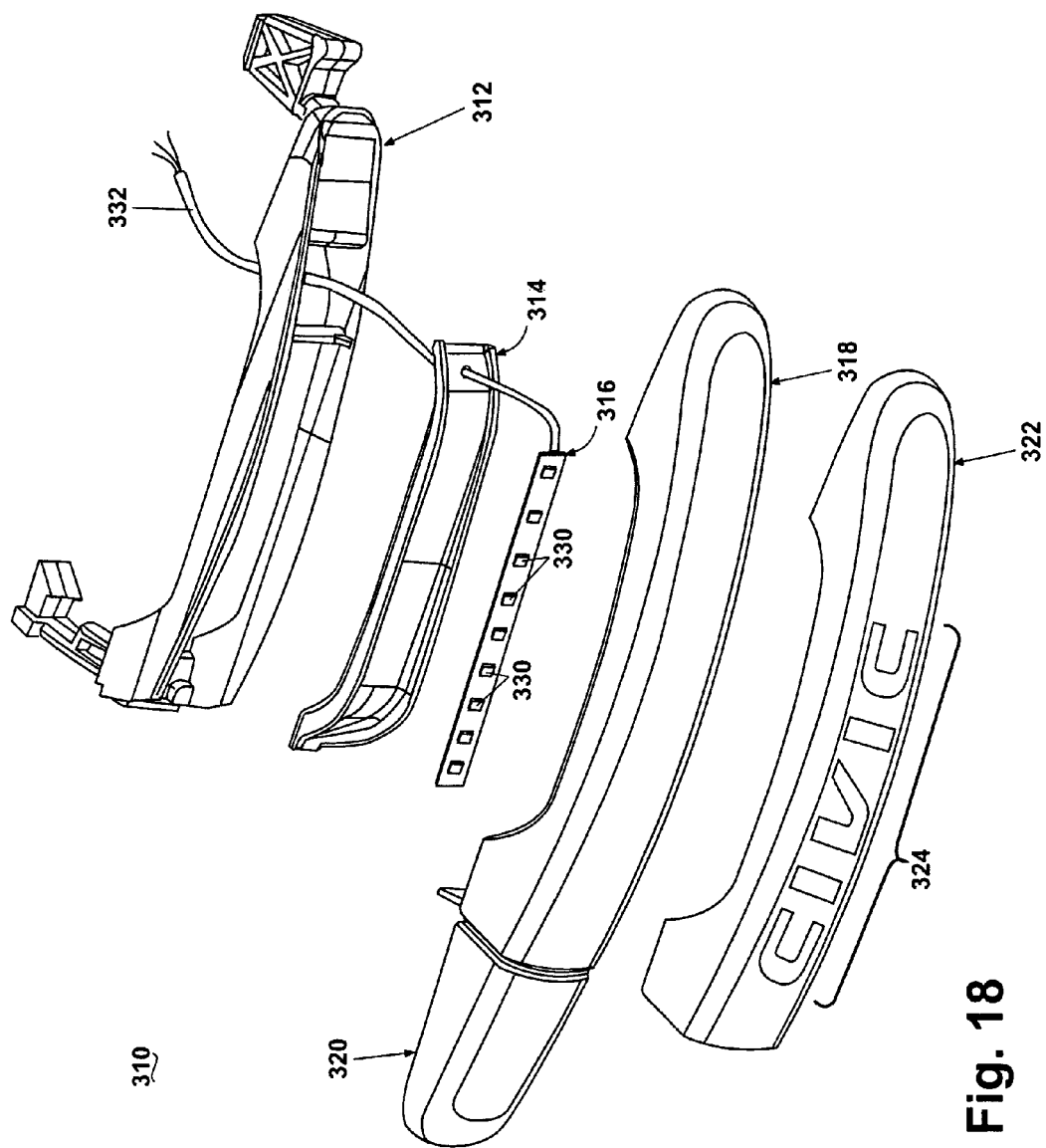
FIG. 18 an exploded, perspective view of a vehicular door handle comprising an alternative embodiment of the invention.
Figure 19:
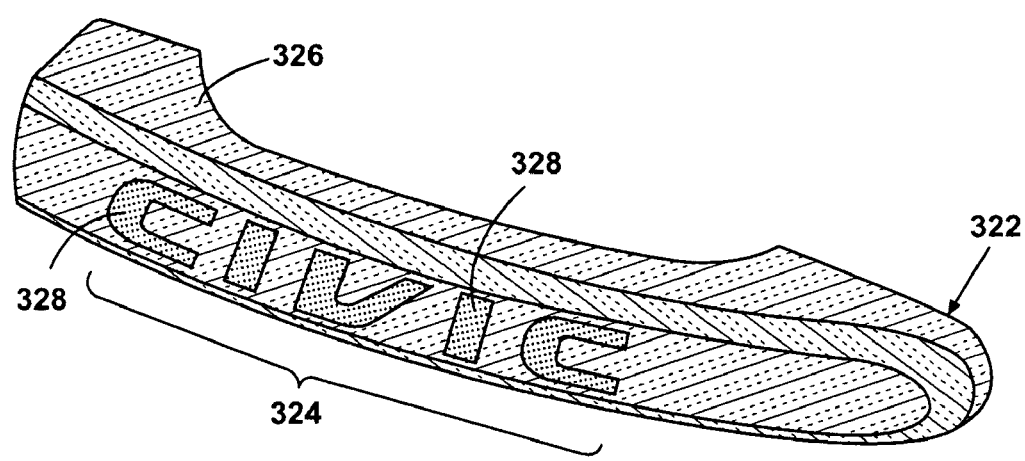
FIG. 19 is an enlarged, perspective view of a portion of the vehicular door handle of FIG. 18.

Yet another embodiment of the trim component is illustrated in FIGS. 18 and 19. The embodiment of FIGS. 18 and 19 shares many of the features of the previously described embodiments, which will not be described in detail herein unless necessary for a complete understanding of the invention. FIG. 18 illustrates an exemplary exploded view of a door handle assembly 310 having an overlying selectively light transmissive indicia coating 322. The indicia coating 322 can incorporate a pattern 324, such as alphanumeric characters or symbols, which is invisible when light, such as sunlight, impinges on the door handle assembly 310, but visible when backlit. The indicia coating 322 can be incorporated into the door handle assembly 310 so that, when the indicia are invisible, the door handle assembly 310 seamlessly blends in with the rest of the vehicle to which it is attached, as hereinafter described.

The door handle assembly 310 can comprise a substrate in the form of a grip cover 318 that mates with a handle housing 312 pivotally mounted to a vehicle door (not shown) and operatively coupled with a door latch (not shown) located inside the door. Together, the grip cover 318 and the handle housing 312 can form a grip that can be grasped by a user. The door handle assembly 310 can further include an illumination source holder 314 mounted to the handle housing 312 and sandwiched between the housing 312 and the grip cover 318. The illumination source holder 314 can support an illumination source assembly 316 comprising a plurality of illumination elements 330 to provide backlighting to the pattern 324. The illumination elements 330 can be any suitable source of light such as light emitting diodes (LEDs) that can be illuminated individually, in groups, or all at once. An illumination source assembly wire harness 332 can extend through the handle housing 312 to be coupled with the vehicle power and control systems (not shown), for controlling the operation of one or more of the illumination elements 330.

The door handle assembly 310 can also comprise a bezel 320 mounted to the vehicle door adjacent to and coextensive with the grip cover 318.

The indicia coating 322 can comprise a specialty paint or finish that can be applied to the grip cover 318 through a coating process, such as a spray process, hydrographic or dip process, or other suitable coating process known in the art. The specialty paint or finish can comprise a selectively light transmissive coating that inherently renders the pattern 324 invisible in bright light until the illumination source assembly 316 is activated to backlight the pattern 324 and thereby render the pattern visible. Alternatively, the thickness of the indicia coating 322 can be carefully controlled to provide a selected level of light transmissivity. The indicia coating 322 can be applied in two different thicknesses, the lesser thickness being associated with the pattern 324, and the greater thickness being associated with the remaining area of the coating 322.

The selected pattern 324 to be rendered visible when backlit can also result from modifications of portions of the indicia coating 322 to enhance its light transmissivity associated with such pattern. For example, the indicia coating 322 can be removed entirely in the selected pattern after the coating 322 has been applied over the entire substrate, and replaced with a more light transmissive coating. The application of the indicia coating 322 can be controlled, such as through the use of stencils or paint masks, so that no indicia coating 322 is applied over the pattern. The pattern can subsequently be coated with a more light transmissive coating. The indicia coating 322 can also be adapted to reflect light that impinges on the door handle assembly 310, thereby enhancing the concealment of the indicia when not backlit.

As illustrated in FIG. 19, the indicia coating 328 corresponding to the selected patterns 324 can be partially removed or incised, such as by scoring, fine crosshatching, stippling, etching, carving, and the like, to enhance its transmissivity, while maintaining the opacity or masking capabilities of the remaining indicia coating 322. Other characteristics that can be controlled to control the transmissivity of selected patterns in the indicia coating 322 include paint color, the color of the illumination elements 330, the intensity of the light emitted from the illumination elements 330, and the like.

The use of a specialty paint or finish as described above can eliminate the need for a separate mask to block light from the illumination source assembly 316 in order to illuminate the selected characters or symbols 324. A single layer serving as both a finish coat and a mask layer can simplify the process of fabricating a door handle assembly 310 by eliminating an extra layer while producing a door handle assembly that can blend in with the vehicle's overall color and finish, thereby accelerating production and reducing costs.

Figure 20:
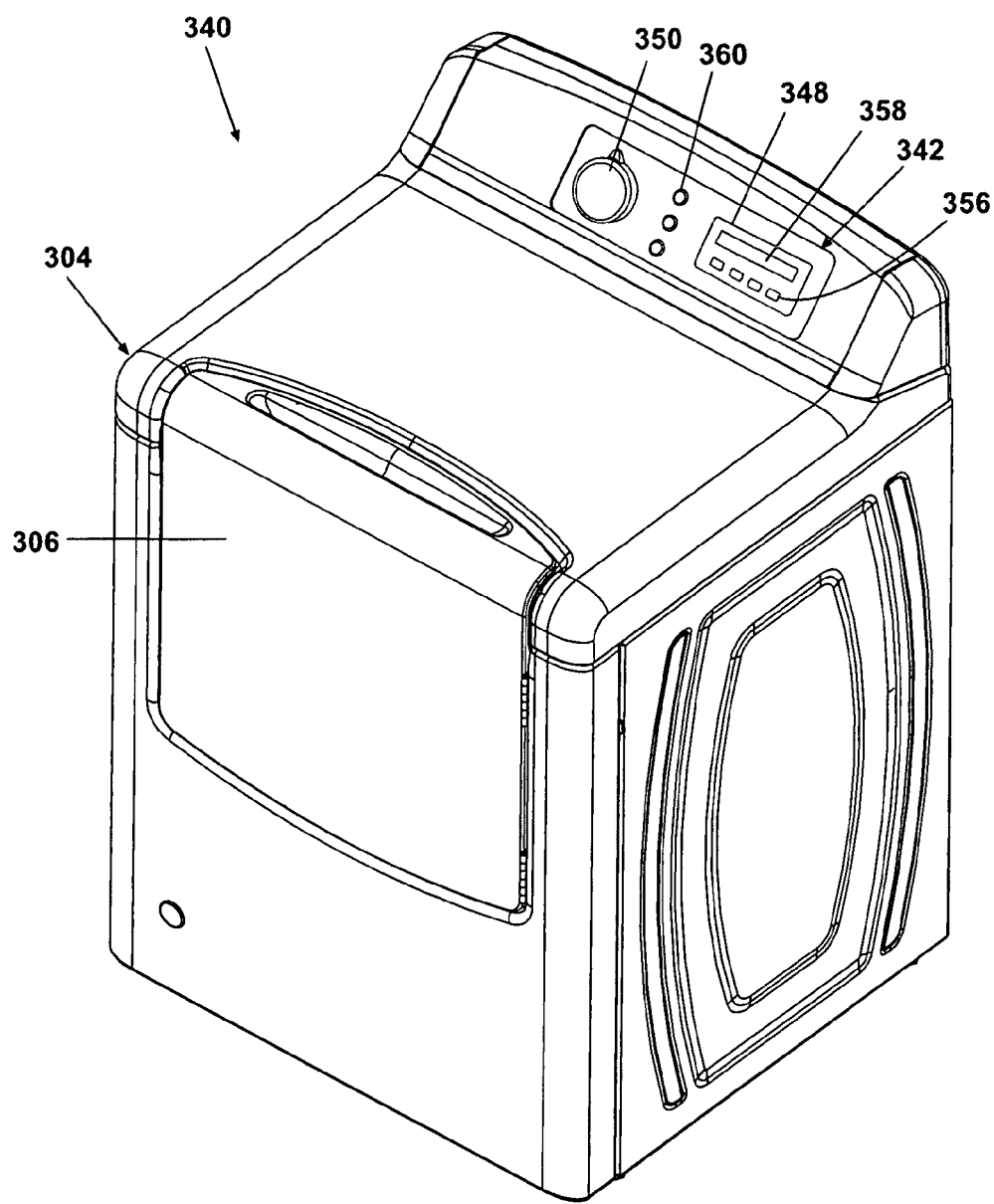
FIG. 20 is a perspective view of a clothes dryer comprising an alternative embodiment of the invention.
Figure 21:
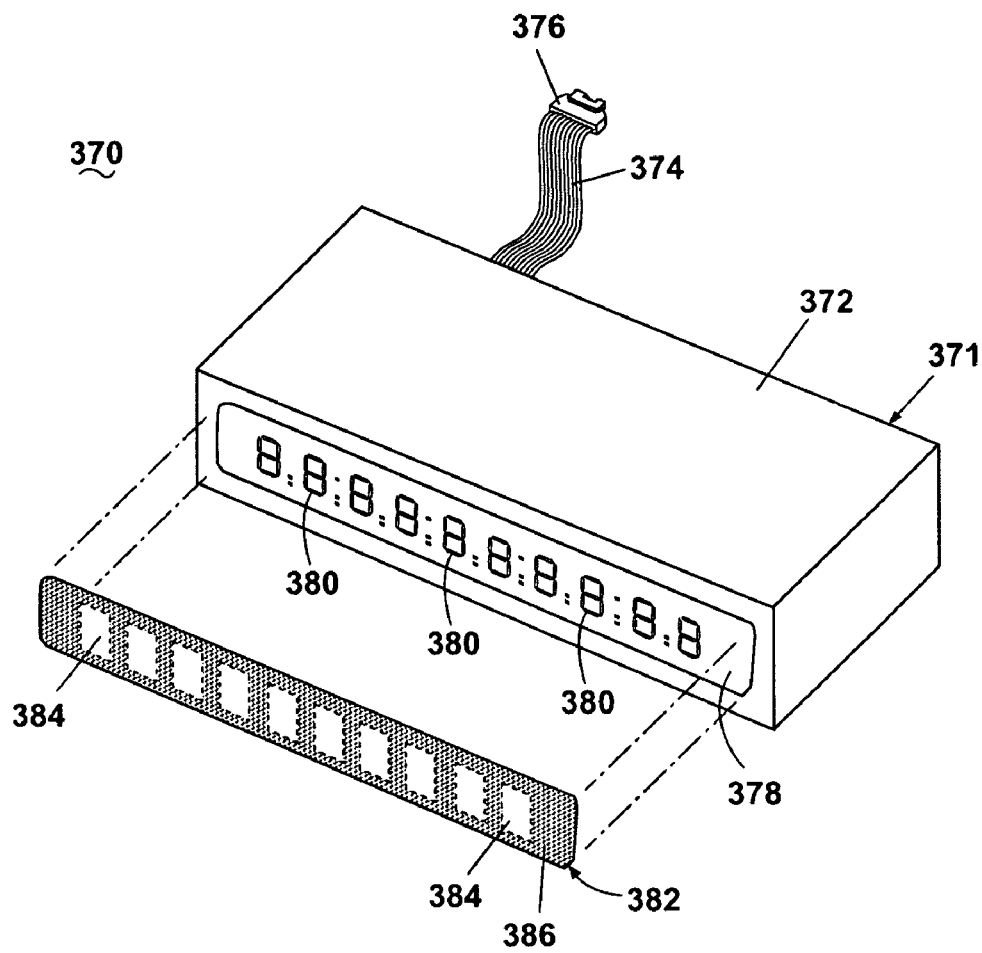
FIG. 21 is a perspective view of a 7-segment display assembly comprising an alternative embodiment of the invention.

The invention is not limited to vehicle door handles, or to vehicles in general. The invention can also be incorporated into items such as appliances. As illustrated in FIG. 20, the invention can be incorporated into an automatic clothes dryer 340 comprising a cabinet 344 having a door 346 providing access to an interior drum (not shown). The clothes dryer 340 can also comprise a substrate in the form of a control panel 342 mounted to an upper portion of the clothes dryer 340 and comprising a user interface 348 according to the invention. The user interface 348 can have a plurality of operational keys 356 and a display 358. The control panel 342 can also include a control knob 350 and control buttons 360. The knob, keys, buttons, display, and other interactive control devices can provide information and control functionality to a user.

The keys 356, control knob 350 and control buttons 360 can comprise flush-mounted, soft-touch control wheels, buttons, and keys, or control wheels, buttons, and keys utilizing sensors, such as field effect sensors or capacitance sensors, that can be activated when a user's finger is in the vicinity of the sensor, and which can more readily accommodate an indicia coating.

The control panel 342, including the user interface 348, control knob 350, and control buttons 360, can be adapted with an indicia coating so that, when the clothes dryer 340 is not in use, the control panel 342 is effectively concealed, and when the clothes dryer 340 is in use, the control panel 342, user interface 348, control knob 350, and control buttons 360 can be backlit, rendering them visible to a user of the appliance. It may be necessary to utilize an illumination source capable of sufficiently illuminating the control panel 342, user interface 348, control knob 350, and control buttons 360 in bright light, such as daylight or conventional interior lighting.

The illumination source can comprise an illumination source holder supporting an illumination source assembly comprising a plurality of illumination elements, generally as described above. It is assumed that configuration of these elements for use in an appliance control panel rather than a vehicle door handle assembly is within the abilities of a person having an ordinary level of skill in the art.

Alternatively, the illumination source can comprise a known 7-segment display assembly 370, which provides both illumination and information. The display assembly 370 can comprise a 7-segment display console 371 and an indicia coating 382. The display console 371 can comprise an enclosure 372 containing at least one illuminating 7-segment display indicium 380, associated electronic control circuitry, power subassemblies, and the like, coupled with the vehicle electrical system through a wire harness 374 and connector 376. A substrate in the form of a display panel 378 extending along one wall of the enclosure 372 can incorporate or overlay one or more indicia 380, such as alphanumeric characters. The indicia coating 382 having a selected color and finish can be applied to the display panel 378 to conceal the 7-segment display and blend the display console 372 into adjacent body panels. Alternatively, the indicia coating 382 can be applied directly over the 7-segment display indicia 380. The indicia coating 382 can incorporate a plurality of transmissive portions 384, each aligned with an indicium 380, and surrounded by a mask portion 386 generally as described above. The display assembly 370 can be incorporated into a motor vehicle component, an appliance, signage, signaling devices, and the like.

For components or applications in which the indicia are only observed or only convey information, the indicia coating configurations described above can be utilized. However, if the indicia are to additionally facilitate the selection of a functionality, such as a keypad, the configuration can incorporate one or more functionality switches, such as a field effect sensor, a capacitance sensor, a pressure pad, a multi-touch screen, and the like.

The control panel can be configured with an illumination source for each selectable control. Utilizing, for example, a field effect sensor adapted so that touching any part of the control panel will actuate the illumination sources, specific indicia associated with each selectable control will be visible and can be selectively actuated by the user. Individual indicia can also be actuated by a field effect sensor, a multi-touch display panel, and the like. The control panel electronics can be adapted so that, after the user has completed the actuation of controls, the indicia and illumination sources not associated with the selected controls can be automatically switched off. Informational indicia associated with a selected operation or function, such as water temperature, laundry load weight, selected wash cycle, and the like, can continue to be illuminated. A 7-segment display assembly may be particularly well suited for displaying such information. Thus, for example, during use of the appliance, only those indicia associated with a selected operation or function will remain illuminated. Those indicia not associated with a selected operation or function will be concealed, and the overlying finish layer will "blend in" with the adjoining surfaces.

The selectively light transmissive indicia coating as described herein can also be utilized for brake lights, parking lights, turn indicators, and the like. The indicia coating can be adapted for light transmissivity in areas corresponding to the brake lights, parking lights, turn indicators, etc. the remainder of the indicia coating can be opaque, to serve as a mask portion. In ambient light, the brake lights, parking lights, turn indicators, etc. will be concealed behind the indicia coating, with the entire assembly having a color and finish blending in with the color and a finish of adjacent portions of the vehicle. However, when braking, using the turn indicators, or actuating the braking lights, light will be transmitted through the transmissivity areas.

The indicia coating can be used with lock/unlock indicators incorporated into the vehicle door or other panels. When the door is unlocked, either with a key, a wireless control such as a key fob, or a code-based keyless entry system, a light element can be briefly activated to indicate the locked/unlocked condition; when deactivated, the light element can be concealed behind the indicia coating, which will blend in with adjacent panels.

Other applications can include dome lights, supplemental exterior area lighting, license plate illumination, and the like. The trim component described herein can comprise a part of other vehicles, such as aircraft, watercraft, motorcycles, personal watercraft such as Sea-Doos® and Waverunners®, all-terrain vehicles, and the like. The trim component can also comprise a part of any other appliance, such as clothes washers, dishwashers, refrigerators, freezers, laundry pedestals, and portable appliances, such as vacuum cleaners, countertop mixers, blenders, coffeemakers, radios, music systems, and food processors. Virtually any actuatable apparatus that incorporates informational displays or controls can incorporate the trim component, as generally described herein. The use of the selectively light transmissive indicia coating can enhance the styling and appearance of such apparatus by concealing indicia and illumination sources until the illumination source is actuated, and the indicia are revealed. The use of a single layer that can be adapted as both a mask portion and an unmasked portion can simplify the fabrication and finishing of the apparatus, enhance the appearance of the apparatus, and reduce the costs of fabrication.

While the invention has been specifically described in connection with certain specific embodiments thereof, it is to be understood that this is by way of illustration and not of limitation, and the scope of the appended claims should be construed as broadly as the prior art will permit.

What is claimed is:

1. A component of an actuatable apparatus, the component comprising:
    a substrate including an obverse surface and an opposed reverse surface, one of said obverse surface and said reverse surface defining a transparent selected area;
    a selectively light-transmissive opaque covering applied to one of said obverse surface and said reverse surface to selectively enable and prevent transmission of said light therethrough;
    said opaque covering disposed to intercept light directed through said selected area;
    said opaque covering characterized by first and second portions collectively defining a pattern associated with said selected area;
    said first portion having a first transmissivity to light to enable transmission of said light therethrough; and
    said second portion having a second transmissivity to light to prevent or impede transmission of said light therethrough; and
    an illumination source actuatable between an illuminated state and a non-illuminated state, and adjacent said reverse surface for illuminating said selected area;
    wherein actuation of said illumination source directs light through said first portion but not through said second portion to thereby reveal said pattern; and
    wherein said opaque covering renders said pattern invisible when said illumination source is in said non-illuminated state, and visible when said illumination source is in said illuminated state.

2. The component of claim 1 wherein said opaque covering is a paint.

3. The component of claim 1 wherein said pattern is defined by removing said opaque covering associated with said pattern from said selected area.

4. The component of claim 1 wherein said pattern is defined by applying said opaque covering over said selected area in two different thicknesses, a lesser thickness being associated with said pattern, and a greater thickness being associated with the remaining area not comprising said pattern.

5. The component of claim 1 wherein said pattern is defined by selectively incising said opaque covering to enhance its transmissivity.

6. The component of claim 5 wherein said incising comprises one of scoring, crosshatching, stippling, etching, and carving.

7. The component of claim 1 wherein said actuatable apparatus comprises a vehicle door handle.

8. A method of fabricating an actuatable apparatus so that a pattern associated with a component can be selectively revealed and concealed, the method comprising:

selecting a substrate including an obverse surface and an opposed reverse surface, one of said obverse surface and said reverse surface defining a transparent selected area;

applying a selectively light-transmissive opaque covering to one of said obverse surface and said reverse surface to selectively enable and prevent transmission of said light therethrough, said opaque covering disposed to intercept light directed through said selected area;

adapting said opaque covering into first and second portions to collectively define a pattern associated with said selected area;

said first portion having a first transmissivity to light to enable transmission of said light therethrough; and said second portion having a second transmissivity to light to prevent or impede transmission of said light therethrough;

adapting said opaque covering to render said pattern invisible when an illumination source is in a non-illuminated state, and visible when said illumination source is in an illuminated state; and positioning adjacent said reverse surface said illumination source for illuminating said selected area, said illumination source actuatable between said illuminated state for transmitting light through said pattern to reveal said pattern, and said non-illuminated state for obscuring said selected area and concealing said pattern.

9. The component of claim 1 wherein said translucent or transparent substrate includes a curved portion and said selected area is coextensive with said curved portion.

* * * * *